(No Model.)
H. REYNOLDS.
SHOVEL.
No. 467,831. Patented Jan. 26, 1892.
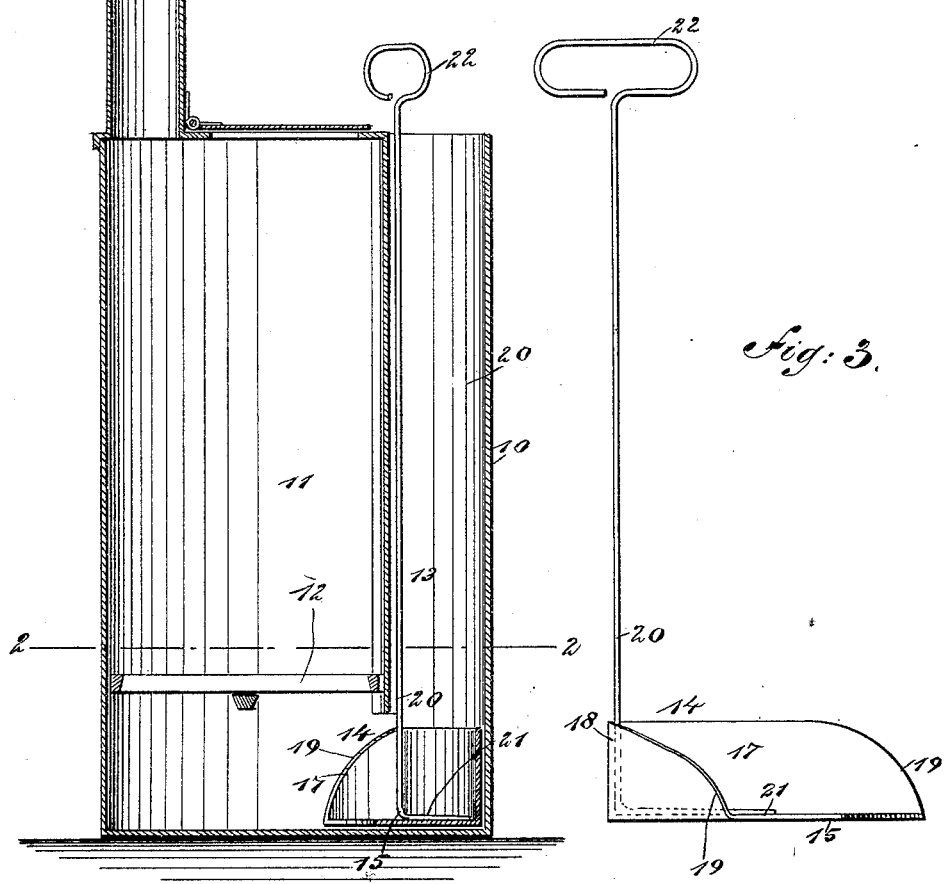
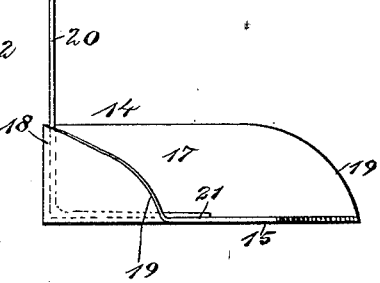
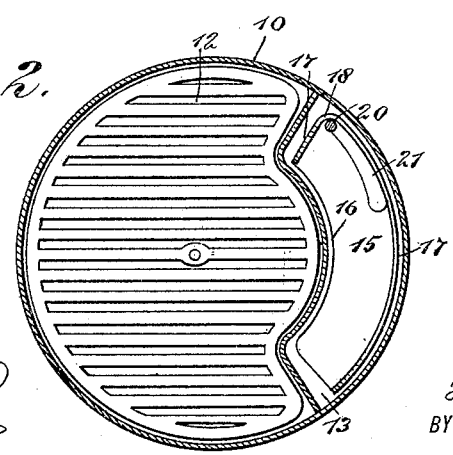
WITNESSES:
Chas. Nidd.
E. M. Clark
INVENTOR
Hanford Reynolds
BY Munn & Co
ATTORNEYS.

UNITED STATES PATENT OFFICE.

HANFORD REYNOLDS, OF GIFFORD, ILLINOIS.

SHOVEL.

SPECIFICATION forming part of Letters Patent No. 467,831, dated January 26, 1892.

Application filed August 31, 1891. Serial No. 404,205. (No model.)

*To all whom it may concern:*

Be it known that I, HANFORD REYNOLDS, of Gifford, in the county of Champaign and State of Illinois, have invented a new and Improved Shovel, of which the following is a full, clear, and exact description.

My invention relates to improvements in shovels such as are adapted to be used in cleaning out tank-heaters and feed-cookers of the class described in the United States Patent No. 405,052, dated June 11, 1889.

The object of my invention is to produce a shovel which may be cheaply built, which is strong and durable, and which may be easily inserted beneath the grate of a heater and cooker of the class described and turned so as to scoop up the ashes therein.

To this end my invention consists in a shovel the construction of which will be hereinafter described and claimed.

Reference is to be had to the accompanying drawings, forming a part of this specification, in which similar figures of reference indicate corresponding parts in all the views.

Figure 1 is a vertical section of the heater and cooker with the shovel in position in the same. Fig. 2 is a sectional plan view on the line 2 2 in Fig. 1, and Fig. 3 is a detail perspective view of the shovel.

In order to show the application of the shovel, I have shown in outline a heater and cooker, which comprises a main case 10, an inner fire-box 11, having a grate 12, and an air-passage 13, leading from the top of the case to the bottom of the fire-box. The shovel 14 comprises a flat base portion 15, adapted to rest flatwise upon the bottom of the heater, and this base-plate of the shovel is concaved on its front side, as shown at 16 in Fig. 2, so that it may fit the inner wall of the air-passage 13 and pass easily through the same. The plate 15 has the back and one end provided with a side wall 17, which is preferably formed of sheet metal, and it may be stamped out of the same piece as the base-plate, the plate 17 being doubled at one corner, as shown at 18, and having its ends beveled, as shown at 19, to enable it to be easily turned beneath the grate 12 of the heater and also to enable it to be easily withdrawn, as the beveled edges striking the partition above will guide the shovel into the passage 13.

The shovel is provided with a vertical handle 20, which is arranged at right angles to the base-plate 15 and the lower end of which is preferably bent, as shown at 21, and made to rest firmly on the base-plate of the shovel, to which it is firmly attached. The upper end of the handle 20 terminates in a large hand-hold 22, by means of which the shovel may be easily turned and lifted.

To operate the shovel, it is lowered into the air-passage 13 until it rests upon the floor of the heater 10, and it is then turned beneath the grate 12, thus scooping up the ashes. When filled, it is turned back to its original position, and is raised through the passage 13.

Having thus fully described my invention, I claim as new and desire to secure by Letters Patent—

1. A shovel comprising a base-plate having a flange or side wall on its back and one end, said flange or wall having beveled ends and provided with a vertical handle, substantially as described.

2. A shovel comprising a base having a concaved front edge, a side and end wall for the base, and a handle secured to the base so as to extend vertically therefrom, substantially as described.

HANFORD REYNOLDS.

Witnesses:
RUSH CARLEY,
J. D. MORSE.